United States Patent
Raymond et al.

(10) Patent No.: US 9,747,599 B2
(45) Date of Patent: Aug. 29, 2017

(54) METHOD AND SYSTEM FOR IDENTIFYING AND PROCESSING CURRENCY CONVERSION IN A FINANCIAL TRANSACTION

(75) Inventors: Doug Raymond, New Canaan, CT (US); Derek Madison, O'Fallon, MO (US); Joyce O'Connell, Wildwood, MO (US); Michelle Grist, Greenville, IL (US); Dale Wilkis, Crestwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 441 days.

(21) Appl. No.: 11/695,560

(22) Filed: Apr. 2, 2007

(65) Prior Publication Data
US 2008/0059350 A1 Mar. 6, 2008

Related U.S. Application Data

(60) Provisional application No. 60/788,418, filed on Mar. 31, 2006.

(51) Int. Cl.
G06Q 40/00 (2012.01)
G06Q 30/00 (2012.01)

(52) U.S. Cl.
CPC .............. G06Q 30/00 (2013.01); G06Q 40/00 (2013.01)

(58) Field of Classification Search
USPC ............................................... 705/35, 38–45
See application file for complete search history.

(56) References Cited

U.S. PATENT DOCUMENTS

| | | | |
|---|---|---|---|
| 6,999,943 B1* | 2/2006 | Johnson | G06Q 20/10 705/35 |
| 7,328,188 B1 | 2/2008 | Barry | |
| 2004/0148255 A1* | 7/2004 | Beck | G06Q 10/02 705/39 |
| 2004/0153406 A1* | 8/2004 | Alarcon-Luther | G06Q 20/00 705/41 |
| 2005/0131806 A1* | 6/2005 | Barry | G06Q 20/04 705/39 |
| 2005/0154674 A1* | 7/2005 | Nicholls | G06Q 20/04 705/43 |
| 2006/0006224 A1 | 1/2006 | Modi | |

FOREIGN PATENT DOCUMENTS

| | | | |
|---|---|---|---|
| WO | WO 03/067535 | * | 8/2003 |
| WO | WO 2004/044822 | * | 5/2004 |
| WO | WO 2004/077246 | * | 9/2004 |

* cited by examiner

*Primary Examiner* — Olabode Akintola
(74) *Attorney, Agent, or Firm* — Baker Botts L.L.P.

(57) ABSTRACT

A method and a system for processing cross-border transactions in a multiple party payment card processing network is disclosed. A party evaluates an inbound transaction message received from a downstream party to determine if the corresponding payment transaction is a cross-border transaction and if it requires currency conversion processing. Based on the evaluations, a cross-border and currency conversion status indicator that is attached to outbound transaction messages sent to upstream entities in the payment network. Currency conversion service fees and/or rebates may be assessed to other entities in the payment card network according to the results of the evaluations.

14 Claims, 4 Drawing Sheets

METHOD AND SYSTEM FOR IDENTIFYING AND PROCESSING CURRENCY CONVERSION IN A FINANCIAL TRANSACTION

CROSS-REFERENCE TO RELATED APPLICATIONS

This application claims the benefit of U.S. Provisional Patent Application Ser. No. 60/788,418, filed on Mar. 31, 2006, entitled "Method and System for Identifying and Processing Currency Conversion in a Financial Transaction," which is hereby incorporated by reference in its entirety herein.

BACKGROUND OF THE INVENTION

The disclosed subject matter relates to a method and system for identifying financial transactions that occur across national and regional borders and processing currency conversion for such financial transactions.

The use of payment devices that are linked to customer accounts (e.g., credit cards, debit cards, charge cards, smart cards, etc.) is commonplace for conducting financial transactions in the modern economy. The payment-by-card industry involves many different entities (e.g., card issuers, merchant acquirers, payment processors, etc.) that perform various tasks for processing payment-by-card transaction data ("transactions"). The various tasks for processing include, for example, handling the information and payment flows needed for converting an electronic record created at the point of sale into cash for the merchant. FIGS. 1A and 1B show an exemplary four-party network involved in processing payment-by-card transactions including transaction authorization, and clearing and settlement. The processing of payment card transaction is subject to industry regulations and national laws designed to protect parties and to appropriately transfer liability, for example, in the case of fraud or chargebacks.

The payment-by-card transactions may involve a buyer from one country (or currency region) and a seller from another country (or currency region). Such "cross-border" transactions may occur in a variety of situations, for example, when a buyer travels abroad and purchases an item from a local merchant, or when a buyer purchases an item on-line from a foreign merchant. Cross-border transactions can also occur in situations not involving a merchant or seller, for example, when a cardholder withdraws money from an automated teller machine (ATM) in a foreign country, or otherwise uses the payment device (e.g., a debit card) to transfer funds across national borders.

International or global payment card processing systems or networks for processing cross-border transactions may be similar to payment card processing systems or networks for processing single currency transactions (see e.g., FIGS. 1A and 1B). However, processing of a cross-border financial transaction generally requires some form of currency conversion because the cardholder's native currency (e.g., the designated currency in which the associated payment account is held) will usually not be the same as the currency of payment required by the merchant or seller. Further, each of the countries or regions across whose borders the financial transaction takes place may have different sets of regulations and laws (e.g. foreign currency exchange regulations, chargeback rules, or banking laws) that are applicable to the transaction. A centralized global payment card processing system or network must be able to appropriately identify whether a currency conversion process for a requested payment card transaction is necessary or has already been performed by other parties (e.g., merchants and acquirers) before submission of the requested payment card transaction for processing. Each of the entities (e.g., banks, merchants, acquirers, card issuers, etc.) involved in processing a "foreign currency" transaction may levy currency-conversion fees for their services in addition to their usual fees for processing "single currency" transactions.

It is noted that, for convenience in description, the singular term "transaction" as used herein may interchangeably refer not only to the use of a payment card by a cardholder (e.g., to make a purchase at a merchant or withdraw cash at an ATM), but also to the subsequent series of transactions between entities in the payment card network (e.g., acquirers, issuers, payment card network, card association, etc.). Further, the singular term "transaction" may also interchangeably refer to the transaction "event," transaction data and/or transaction messages between the entities in the payment card network and/or other networks (e.g., banking networks).

Consideration is now being given to ways of enhancing a global payment card processing system to make it responsive to different legal and regulatory environments applicable to cross-border transactions. Further, attention is directed to allocating the costs of maintaining a global payment card processing system infrastructure and the costs of performing cross-border settlement to the various entities. A desirable global payment card processing system will be competitive in the payment-by-card industry with regard to the provision of foreign currency conversion services.

SUMMARY OF THE INVENTION

A method for processing cross-border payment card transactions and an improved system (or clearing platform) for clearing and settling such transactions are provided.

The inventive method and system are for processing cross-border transactions in a multiple-entity payment card processing network. The multiple entities, who may be linked by one or more electronic payment networks, may include entities such as merchants, acquirers, service providers, debit switches, card associations and issuers. Each entity involved in payment card transaction processing generates and receives transactions messages from other entities in a transaction processing flow. At an entity, which receives an inbound transaction message corresponding to a payment card transaction from a downstream entity in the payment card network, the inbound transaction message is evaluated to determine if the transaction is a cross-border financial transaction (e.g., by comparing a merchant country code and an account range code contained in the transaction message). The inbound transaction message is also evaluated to determine if currency conversion processing has been performed prior to receiving the transaction message by a downstream entity (e.g., by comparing a merchant's country currency and the requested payment currency included the transaction message). If the evaluations indicate that the transaction is a cross-border financial transaction and currency conversion processing has not been performed prior to receiving the transaction message, then the receiving entity may perform currency conversion processing for the payment card transaction. A cross-border and currency conversion status indicator may be populated based on the results of the evaluations. The status indicator may be included in outbound messages (i.e. processed transaction messages) that are sent to upstream entities in the payment network. Currency conversion service fees and/or rebates may be assessed to other entities in the payment card network according to the results of the evaluations.

The inventive system for processing cross-border transactions in a multiple-entity payment card processing network includes logic configured to evaluate the inbound transaction message to determine if the corresponding payment card transaction is a cross-border financial transaction, and to determine if currency conversion processing has been performed prior to receiving the transaction message. The logic is configured to populate a status indicator, that may appended to outbound messages to indicate the cross-border status and currency conversion need or status of the payment card transaction. The system also includes a transaction processor for performing currency conversion processing for the payment card transaction as necessary or desired, and a billing processor which is configured to assess currency conversion service fees and/or rebates to other entities in the payment card network according to the results of the evaluations.

The system has the immediate benefit of preserving a seamless global processing environment where transactions from around the world may be submitted in a multitude of currencies that may not match the countries from which the transaction is originating. The system ensures uninterrupted global processing of payment card transactions.

BRIEF DESCRIPTION OF THE DRAWINGS

Further features and advantages of the disclosed subject matter will become apparent from the following detailed description taken in conjunction with the accompanying figures showing illustrative embodiments of the disclosed subject matter, in which:

FIG. 5 is a schematic illustration of a currency conversion status indicator, which may be placed in an outbound transaction message to flag cross-border transaction status and currency conversion needs, in accordance with the principles of the present invention.

Throughout the figures, the same reference numerals and characters are used to denote like features, elements, components or portions of the illustrated embodiments, unless otherwise stated.

DETAILED DESCRIPTION OF THE INVENTION

A method for processing cross-border payment card transactions and an improved system for clearing and settling such transactions are provided. The inventive method and the improved system for authorization, clearing and settling cross-border transactions ("cross-border transaction handling system" or CBTHS) involve an initial assessment ("cross-border assessment") of a payment card transaction to determine if currency conversion processing is required for the transaction.

The inventive method and system are described herein with reference to their use in conjunction with transaction processing applications (e.g., MasterCard's Debit Switch (MDS) online networks and the Global Clearing Management System (GCMS)), which are provided to the payment-by-card industry by assignee MasterCard International, Inc ("MasterCard"). MDS and GCMS are two non-limiting examples of transaction processing applications with which the cross-border transaction handling system may be used.

Figure 1A:
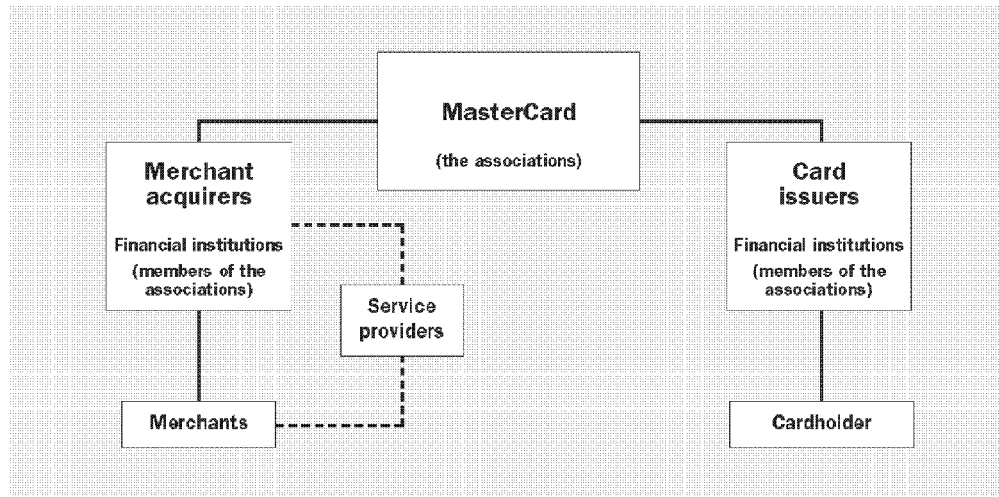
FIGS. 1A and 1B are schematic illustrations of a four-party network for processing payment card transactions.
Figure 1B:
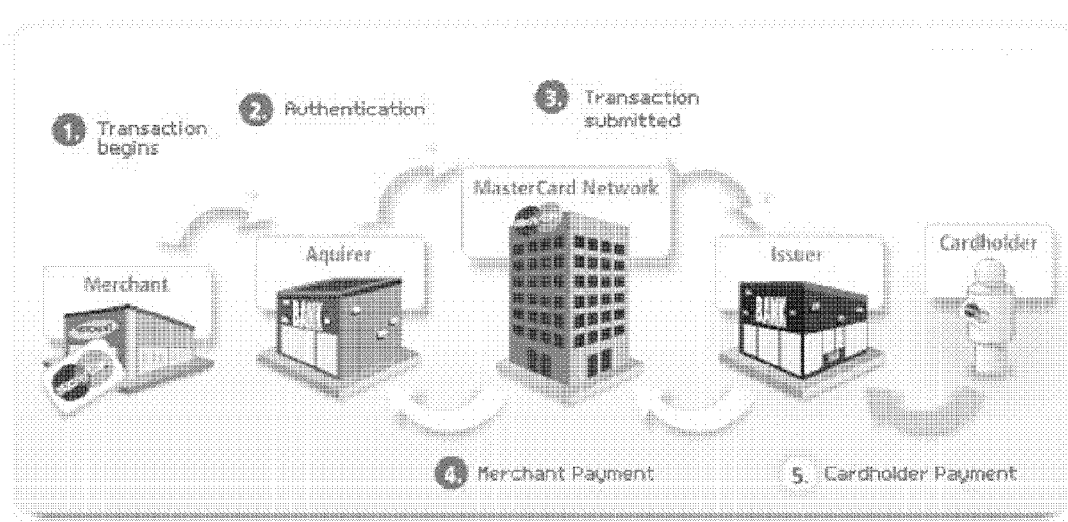

MDS is a debit processing system, which transmits financial messages between acquirers and issuers, provides transaction and statistical reporting, and performs settlement between members and other debit transaction processing networks. GCMS is a centralized payment processing system, which facilitates the processing of payment transactions and information management among the parties. In addition to MasterCard, transaction processing by GCMS involves four participants: issuers (the cardholders' banks), acquirers (the merchants' banks), merchants and cardholders. GCMS uses MasterCard's IP network to link its member banks to retailers and other merchants. (See e.g., FIG. 1B). Payment transaction and information management messages may have a standard industry format, for example, the Integrated Product Message (IPM) format, which is a feature-rich, flexible, variable-length format that supports new technologies such as chip cards, e-commerce and member-to-member proprietary data.
[add format]

In payment transaction processing, authorization occurs when a merchant and/or acquirer requests approval for a cardholder's transaction from an issuer or a designated party. Industry rules, which may vary across regions and geographies, establish the circumstances under which merchants and acquirers must seek authorization of transactions. Clearing and settlement refers to processes that determine the amounts due between issuers/banks and acquirers/merchants for payment transactions and associated fees. For a transaction by a cardholder at a location that settles in a currency other than the native currency (e.g., U.S. dollars), the transaction amount is converted into a U.S. dollar amount by applying an exchange rate, which is generally based on either a government-mandated rate or a wholesale rate determined for the processing cycle in which the transaction is processed. The exchange rate used on the processing date may differ from the rate that would have been used on the transaction date or cardholder statement posting date.

Figure 2:
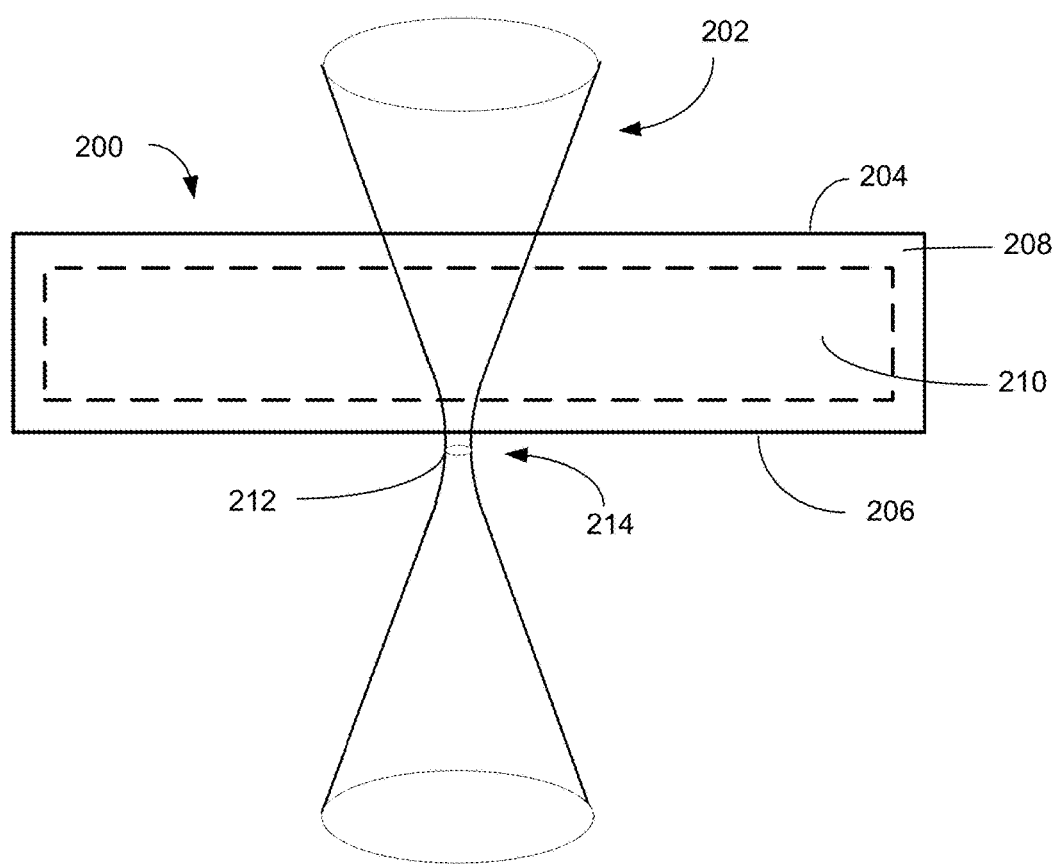
FIG. 2 is a block diagram of an exemplary configuration of a cross-border transaction processing system, a debit switch, and a central payment processing system, in accordance with the principles of the present invention.

In an embodiment of the present invention, the cross-border transaction handling system is coupled to the other payment network entities. (See e.g., FIG. 2). The payment network entities may be located on the same side or across a national or regional border. The cross-border transaction handling system itself may be implemented using any suitable combination of hardware and software, and may be integrated with payment network entities. The cross-border transaction handling system is configured to assess whether a transaction received by a payment network entity is a "cross-border" transaction, and may be further configured to provide dynamic currency conversion processing for such a transaction. It will be understood that in the payment transaction processing flow, each payment network entity receives "inbound" transaction messages for processing from downstream entities, and submits "outbound" transaction messages for further processing to upstream entities.

Figure 3:
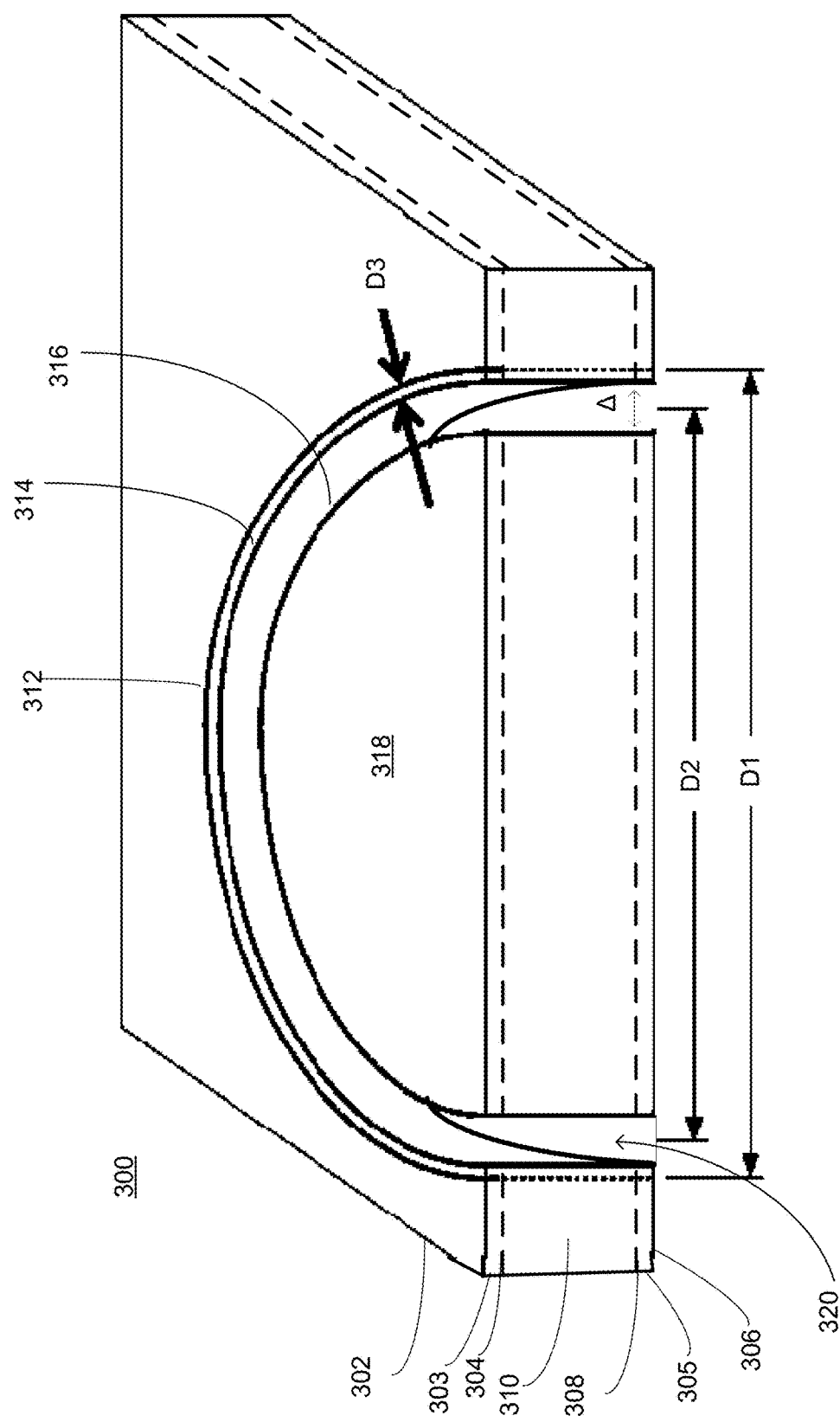
FIG. 3 is a schematic illustration of an in-bound transaction message, in accordance with the principles of the present invention.

FIG. 3 shows an exemplary in-bound transaction message 10, which includes message elements corresponding to a merchant country code 12, an account range code 14, and a transaction currency code 16. Merchant country code 12 is a code corresponding to the country with which the payee (usually a merchant or ATM) is associated. Similarly, account range code 14 is a code corresponding to the country with which the cardholder's payment account is associated. The transaction currency code 16 is a code indicating the designated currency for the financial transaction. It will be understood that transaction message 10 may be in standard IPM format and include other IPM message elements (e.g., transaction type, card brand, etc.).

The cross-border transaction handling system assesses whether a transaction received from a transaction processing application (e.g., in-bound message 10 in FIG. 3) qualifies as a cross-border transaction according to a predefined set of criteria including, for example, merchant or payment account location, transaction type, card brand, etc.

An exemplary set of predefined criteria or rules for qualification of a transaction as a cross-border transaction is as follows:

(1) Transactions where the Merchant Country Code does not equal the Account Range Country Code qualify as cross-border transactions. In the payment card industry standard format messages, this criterion corresponds to data elements DE43-Card Acceptor Name/Location, Card Acceptor Country, being unequal to Alpha Country Code.

(2) The following transaction types are eligible for cross-border assessment:
  First Presentment
  Second Presentment
  First Chargeback
  Arbitration Chargeback (3) The following acceptance brands are eligible for cross-border assessment:
  MasterCard card (MCC)
  Cirrus card (CIR)
  Maestro Card (MSI)
  Debit MasterCard card (DMC)
  any transaction which flows through the transaction payment applications (of one payment band)

Figure 4:
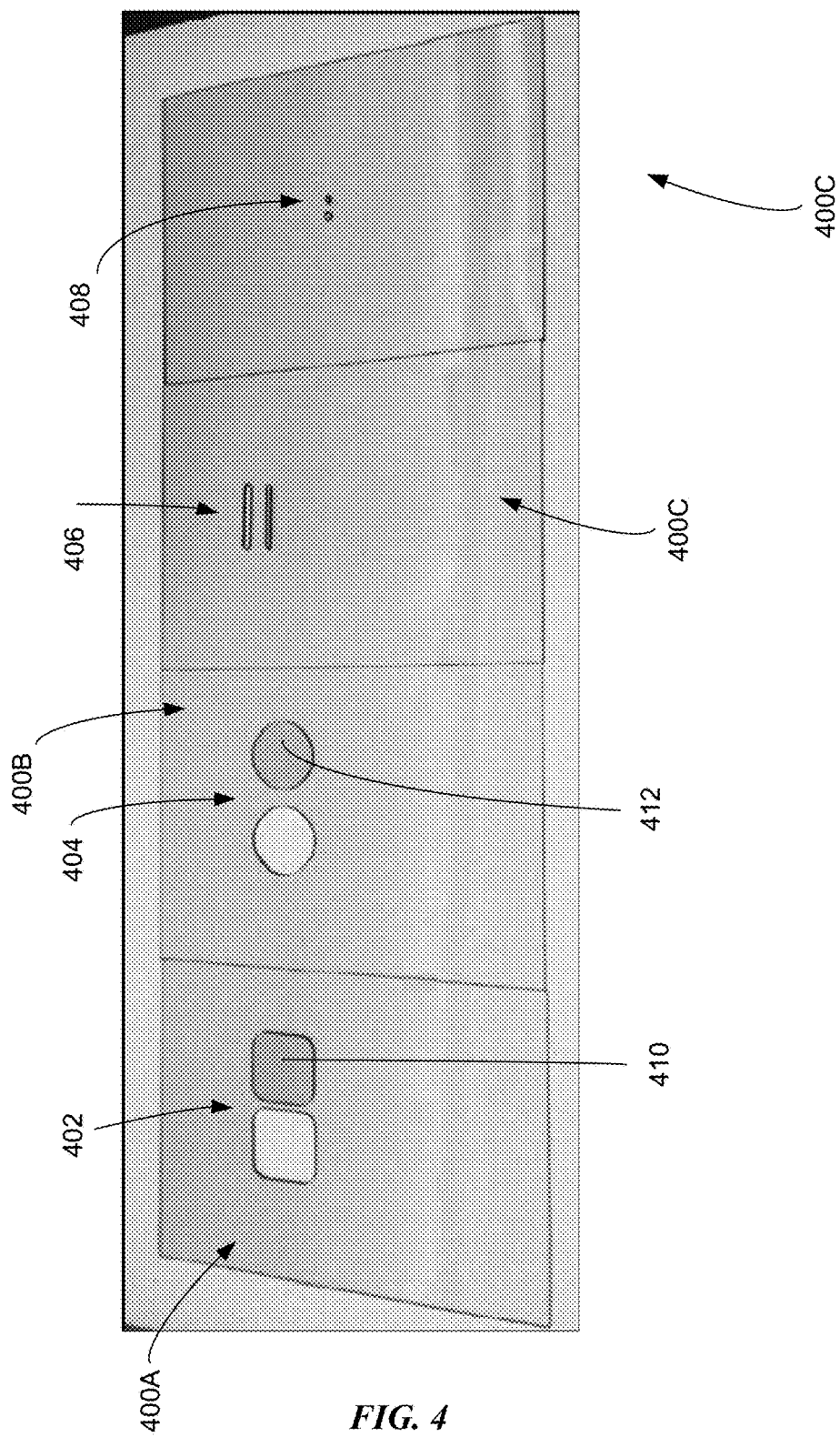
FIG. 4 is a flow diagram illustrating the logic used to determine whether currency conversion processing should be performed on an in-bound transaction message, in accordance with the principles of the present invention.

FIG. 4 illustrates logic 100 used in the cross-border transaction handling system to determine whether an inbound transaction is a cross-border transaction and whether prior currency conversion processes have been applied to the transaction. After transaction message 10 is received (step 110), at step 120 merchant country code 12 is compared to account range country code 14 for cross-border qualification. If merchant country code 12 does not equal account range country code 14, then transaction message 10 is qualified as a cross-border transaction and processing proceeds to step 130. However, if merchant country code 12 equals account range code 14, transaction message 10 is not qualified as a cross-border transaction (i.e., it is a single country transaction) and is submitted for further transaction processing at step 150. If a transaction does not qualify as a cross-border transaction, then there is no need to determine whether prior currency conversion processes have been applied to the transaction.

If a transaction qualifies as a cross-border transaction, a determination is made at step 130 whether prior currency conversion processes have been applied to the cross-border transaction (e.g., by merchant, acquirer, or transaction processing application) prior to its receipt at step 110. If the transaction currency 16 equals the national currency of the merchant country, then prior currency conversion processes have not been applied to the inbound transaction. For example, if the merchant's country is Mexico and the submitted transaction currency is Mexican pesos (Mexico's national currency), then prior currency conversion processes have not been applied to the inbound transaction. Conversely, if the transaction currency 16 does not equal the national currency of the merchant country (e.g. the merchant's country is Mexico, but the submitted transaction currency is Canadian dollars) then prior currency conversion processes have been applied to the inbound transaction. The results of step 130 indicate whether the merchant and/or acquirer themselves provide currency conversion services or rely on a transaction processing application for such services.

When prior currency conversion processes have been applied, the transaction is submitted for further transaction processing at step 150. The cross-border transaction handling system analyzes the flags received from the transaction processing application and applies qualifying criteria and logic as applicable.

After the cross-border assessment, a transaction processing application may suitably supplement an outbound transaction (e.g., an IPM message) with message elements or data fields, which indicate whether the transaction qualified as a cross-border transaction, and whether the transaction submitting entity (e.g., merchant or acquirer) manages its currency conversion through a transaction processing application. The message elements may, for example, be formatted as MasterCard's standard private data fields (e.g., MasterCard's Private Data Set (PDS)).

FIG. 5 illustrates an exemplary outbound currency conversion status indicator 20. Status indicator 20 may be included in the outbound transaction message sent to a member. Status indicator 20 includes two PDS subfields 22 and 24, which respectively identify whether the transaction qualified as cross-border and whether the merchant/acquirer performed dynamic currency conversion prior to submission. If the transaction qualified as cross-border, subfield 22 is set to "Y". If the transaction did not qualify as cross-border, subfield 22 is set to "N". Similarly, if the merchant/acquirer performed dynamic currency conversion (i.e. the transaction was submitted in the local currency of the merchant), subfield 24 is set to "Y". If the merchant/acquirer did perform dynamic currency conversion (i.e. the transaction was not been submitted in the local currency of the merchant), the dynamic currency conversion field 24 is set to "N". If the transaction did not qualify as cross-border, subfield 24 may be left blank, set to NULL, or filled with another predetermined character not equal to "Y" or "N".

Appendix A lists exemplary attributes, usage configurations, and data field structure of status indicator 20.

GCMS may identify an inbound transaction message (e.g., message 10) as being submitted by an MDS acquirer or a non-MDS acquirer by evaluating data elements in the message. For example, GCMS may identify the MDS-submitted transactions by the ATM Acquirer Switch data field values in message 10:
  "1"=ATM Acquirer
  "4"=Europe MDS ATM Acquirer When the inbound message to GCMS is a MDS-submitted message that includes PDS subfield 22 and 24 values, GCMS can carry those PDS values over to its outbound message. In the case the inbound message to GCMS is submitted by a non-MDS acquirer, GCMS may ignore any PDS or like values in the inbound message and process the inbound message afresh.

The cross-border assessment and dynamic currency conversion processing allows identification of cross-border transaction fees that can be itemized and charged to individual entities (e.g., cardholders merchant, acquirers, issuers, etc.) in the payment network for providing currency conversion processing of their requested transactions. Further, rebates may be provided to entities (e.g., merchants or acquirers) that perform their own currency conversion for transactions before submission for processing. This arrangement of "per-use" cross-border transaction processing fees may encourage elimination or reduction of cumulative post transaction (end-of-cycle file to billing) assessments that are common in the payment-by-card industry.

The cross-border transaction handling system may be configured to perform and manage calculations of cross-border assessments and billing. The cross-border transaction handling system may perform cross-border assessment calculations, and bill members on a periodic basis (e.g., daily or weekly). The cross-border transaction handling system may, for example, create three billing events: Issuer Assessment, Acquirer Assessment, and Acquirer Credit. The latter billing event corresponds to a rebate to acquirers who do not perform their own currency conversion.

With renewed reference to FIGS. 4 and 5, it is noted that there are special situations in which the transaction even if determined as cross "country" borders by logic 100 should not be properly qualified as a cross-border transaction requiring currency processes. Such special situations include, for example, transactions occurring in single currency regions or zones (e.g., Euro Zone or U.S. dollar countries). Logic 100 can be suitably extended to accommodate such situations and to populate subfield 22 in message 20 with an N value instead of a Y value. Logic 100 may, for example, be configured, to recognize that if the merchant's country and acquirer/issuer's country are both in the European Monetary Union and the transaction currency is the Euro (the currency of the European Monetary Union), then the cross-border flag 22 should be set to "N". Logic 100 may further be configured to treat transactions acquired or issued in U.S. territories in the exact same manner as transactions acquired or issued in U.S. For example, the United State Territories of Puerto Rico, U.S. Virgin Islands, Guam, Marianas Islands, and the Marshall Islands should be considered the United States when identifying cross-border transactions.

Table 1 shows a listing of possible scenarios in which the cross-border subfield or flag 22 should not be set to "Y". For example, if the merchant's country is a United States Territory and the acquirer/issuer's country is the United States, then the cross-border flag 22 should be set to "N".

TABLE 1

| Merchant Country | Cardholder Country | Cross-border Flag |
| --- | --- | --- |
| United States | Canada | Y |
| United States Territory | Canada | Y |
| United States | United States | N |
| United States Territory | United States | N |
| Canada | United States | Y |
| Canada | United States Territory | Y |
| United States | United States Territory | N |
| United States | United Kingdom | Y |
| United States | Puerto Rico | N |

As previously noted, the cross-border transaction handling system may be implemented or integrated with one or more transaction processing applications. With renewed reference to FIG. 2 and by way of example only, the cross-border transaction handling system may be implemented or integrated with GCSM and/or MDS. GCMS and MDS may each process portions of a cross-border transaction. The transaction flow scenarios described below identify specific types of transactions in which both GCMS and MDS process portions of a cross-border transaction. In the situations where both systems process these transactions, a basic rule of "first in" applies (i.e. the system that receives the transaction first will apply the cross-border logic and then pass the information on to the next system).

Transaction flow: Acquirer→GCMS→MDS→Issuer
In this case, GCMS will determine if the transaction received from the Acquirer is a cross-border transaction using CBTHS logic and populate PDS subfields 20 and 22 accordingly. GCMS will then send the Presentment/Chargeback message to MDS. MDS will not reassess and apply CBTHS logic, but will pick up PDS subfields from the clearing record in a lift and carry operation.

Transaction flow: Acquirer→MDS→GCMS→Issuer
In this case, MDS will determine if the transaction received from the Acquirer is a cross-border transaction using CBTHS logic and populate PDS subfields 20 and 22 accordingly. MDS will then send the Presentment/Chargeback message to GCMS. GCMS will not reassess and apply CBTHS logic, but will pick up PDS subfields from the clearing record in a lift and carry operation.

Transaction flow: Acquirer→GCMS→Issuer
In this case, GCMS will determine if the transaction received from the Acquirer is a cross-border transaction using CBTHS logic and populate PDS subfields 20 and 22 accordingly. GCMS will then send the Presentment/Chargeback message to the Issuer.

Transaction flow: MasterCard Europe (MCE) Acquirer→MDS→Issuer (Auth), and (MCE)Acquirer→GCMS→Issuer (Clearing)
In this case, GCMS will determine if the transaction received from the MCE Acquirer is a cross-border transaction using CBTHS logic and populate PDS subfields 20 and 22 accordingly. GCMS will then send the Presentment/Chargeback message to the Issuer. Further, MDS also will determine if the transaction it received from the MCE Acquirer is a cross-border transaction using CBTHS logic and populate PDS subfields 20 and 22 accordingly and send the status indicator to the issuer in the online message.

It will be understood that the foregoing is only illustrative of the principles of the disclosed subject matter, and that various modifications can be made by those skilled in the art without departing from the scope and spirit of the disclosed subject matter as defined by the appended claims. Exemplary embodiments may be combined with other exemplary embodiments or modified to create new embodiments.

What is claimed is:

1. A method for processing cross-border transactions in a multiple-entity payment card processing network, wherein the multiple entities include at least two entities such as merchants, acquirers, service providers, debit switches, card associations and issuers associated with the payment card transaction processing, the method comprising:
at an entity in the payment card processing network, said entity distinct from a merchant involved in a payment card transaction, receiving from at least one of said multiple entities an inbound transaction message corresponding to said payment card transaction involving a payment account associated with an account-holder;
evaluating the inbound transaction message using computer-based logic to determine if the payment card transaction is a cross-border financial transaction wherein said evaluating comprises comparing a merchant country code and an account range country code contained in at least one subfield of said inbound transaction message;

only if the payment card transaction is a cross-border financial transaction, further, at said entity in the payment card processing network, using computer-based logic to evaluate the inbound transaction message to determine if currency conversion processing has been performed, wherein determining if currency conversion processing has been performed comprises evaluating whether a transaction currency code in the inbound transaction message equals a national currency of a merchant country corresponding to the merchant country code; and using a transaction processor to perform currency conversion processing for the payment card transaction to convert the national currency of the merchant country to a designated currency in which said payment account associated with the account-holder is held, when the evaluations indicate that the payment card transaction is a cross-border financial transaction and currency conversion has not been performed prior to receiving the inbound transaction message.

2. The method according to claim 1, wherein evaluating the inbound transaction message to determine if currency conversion processing has been performed comprises:

identifying the merchant country associated with the merchant identified in the inbound transaction message;

determining the national currency associated with the merchant country;

and comparing the transaction currency contained in the inbound transaction message with the national currency.

3. The method according to claim 1, further comprising, at the entity receiving the inbound transaction message populating a cross-border and currency conversion status indicator based on the results of the evaluations.

4. The method according to claim 3, further comprising, including the cross-border and currency conversion status indicator in an outbound transaction message sent by the entity receiving the inbound transaction message to an upstream entity in the payment card processing network.

5. A method according to claim 4, wherein said outbound transaction message indicates whether the payment card transaction is a cross-border transaction.

6. The method according to claim 4, wherein said outbound transaction message indicates whether currency conversion processing has been performed for the payment card transaction.

7. The method according to claim 1, further comprising at the entity receiving the inbound receiving message assessing currency conversion service fees and/or rebates to other entities in the payment card processing network according to the results of the evaluations.

8. A system for processing cross-border transactions in a multiple-entity payment card processing network, wherein the multiple entities include at least two entities such as merchants, acquirers, service providers, debit switches, card associations and issuers associated with the payment card transaction processing, the system comprising:

at least one computer processor remote from a merchant involved in a payment transaction, configured with logic to evaluate an inbound transaction message corresponding to said payment card transaction received at an entity in the payment card processing network from at least one of said multiple entities to determine if the payment card transaction is a cross-border financial transaction, wherein said determination comprises comparing a merchant country code and an account range country code contained in at least one subfield of said inbound transaction message, and, only if the payment card transaction is a cross-border financial transaction, to further evaluate the inbound transaction message to determine if currency conversion processing has been performed, wherein determining if currency conversion processing has been performed comprises evaluating whether a transaction currency code in the inbound transaction message equals a national currency of a merchant country corresponding to the merchant country code; and a transaction processor for performing currency conversion processing, wherein said processing converts the national currency of the merchant country to a designated currency in which the payment account associated with an account-holder if the logic evaluations indicate that the payment card transaction is a cross-border financial transaction and currency conversion processing has not been performed prior to receiving the inbound transaction message.

9. The system according to claim 8, wherein the logic is configured to determine if currency conversion processing has been performed by:

identifying the merchant country associated with the merchant identified in the inbound transaction message;

determining the national currency associated with the merchant country;

and comparing the transaction currency contained in the inbound transaction message with the national currency.

10. The system according to claim 8, further comprising a cross-border and currency conversion status indicator that is based on the results of the evaluations.

11. The system according to claim 10, wherein the logic is further configured to include the cross-border and currency conversion status indicator in an outbound transaction message sent by the entity receiving the inbound transaction message to an upstream entity in the payment card processing network.

12. The system according to claim 11, wherein the outbound transaction message indicates whether the payment card transaction is a cross-border transaction.

13. The system according to claim 11, wherein said outbound transaction message indicates whether currency conversion processing has been performed for the payment card transaction.

14. The system according to claim 8, further comprising a billing processor disposed at the entity receiving the inbound receiving message, wherein the billing processor is configured to assess currency conversion service fees and/or rebates to other entities in the payment card processing network according to the results of the evaluations.

* * * * *